United States Patent [19]
Alperovich et al.

[11] Patent Number: 6,038,445
[45] Date of Patent: Mar. 14, 2000

[54] PROVIDING SERVICE AREA DEPENDENT SUBSCRIBER DATA WITHIN A MOBILE TELECOMMUNICATIONS NETWORK

[75] Inventors: Vladimir Alperovich, Dallas; David Boltz, Garland, both of Tex.

[73] Assignee: Ericsson Inc., Research Triangle Park, N.C.

[21] Appl. No.: 08/699,561
[22] Filed: Aug. 19, 1996
[51] Int. Cl.$^7$ ........................................ H04M 3/42
[52] U.S. Cl. ................ 455/422; 455/456; 455/433
[58] Field of Search ................... 455/422, 432, 455/433, 435, 445, 456, 560, 524, 428, 414

[56] References Cited

U.S. PATENT DOCUMENTS

| | | | |
|---|---|---|---|
| 5,208,756 | 5/1993 | Song | 364/449 |
| 5,210,787 | 5/1993 | Hayes et al. | 379/60 |
| 5,440,614 | 8/1995 | Sonberg et al. | 379/60 |
| 5,467,381 | 11/1995 | Peltonen et al. | 379/58 |
| 5,504,804 | 4/1996 | Widmark et al. | 379/63 |
| 5,557,655 | 9/1996 | Lantto | 379/58 |
| 5,568,153 | 10/1996 | Beliveau | 342/357 |
| 5,577,103 | 11/1996 | Foti | 379/59 |
| 5,613,213 | 3/1997 | Naddell et al. | 455/54.1 |
| 5,722,083 | 2/1998 | Konig | 455/517 |
| 5,812,950 | 9/1998 | Tom | 455/440 |

FOREIGN PATENT DOCUMENTS

| | | |
|---|---|---|
| 0 605 120 A1 | 6/1993 | European Pat. Off. . |
| 2 304 497 | 3/1997 | United Kingdom . |
| WO 94/29994 | 12/1994 | WIPO . |
| WO 96/20570 | 7/1996 | WIPO . |
| WO 96/24226 | 8/1996 | WIPO . |

OTHER PUBLICATIONS

PCT International Search Report; PCT/US97/14303; Mar. 30, 1998.

Arnoul Vanweisenaers and Luc Schattenman; Architecture of Cellular Networks and example of Intelligent Networks; 8251 Revue HF Tijdschrift 18, No. 1 (1994), Brussel, BE; pp. 37–43.

G.P. Eleftheriadis and M.E. Theologou; User Profile Identification in Future Mobile Telecommunications Systems; IEEE Network; Sep./Oct. 1994; pp. 33–39.

*Primary Examiner*—Reinhard J. Eisenzopf
*Assistant Examiner*—Duc Nguyen
*Attorney, Agent, or Firm*—Jenkens & Gilchrist, P.C.

[57] ABSTRACT

Subscriber data for a particular mobile station are correlated with a particular service area and stored at a home location register (HLR) associated with that particular mobile station. Whenever the mobile station travels into a mobile switching center (MSC) serving that particular service area, the MSC performs a location update with the HLR. A location update signal further includes data representing the identity of the service area currently serving the mobile station. Upon receiving the location update signal from the serving MSC, the HLR analyzes the received data to determine the identity of the service area currently serving the mobile station and retrieves the subscriber data correlated with that particular service area. The retrieved subscriber data are then transmitted back to the serving MSC in order to provide service area dependent mobile service to the roaming mobile station.

2 Claims, 9 Drawing Sheets

PROVIDING SERVICE AREA DEPENDENT SUBSCRIBER DATA WITHIN A MOBILE TELECOMMUNICATIONS NETWORK

BACKGROUND OF THE INVENTION

1. Technical Field of the Invention

The present invention relates to a telecommunications network and, in particular, to the provision of service area dependent subscriber data to a serving mobile switching center (MSC) within a Public Land Mobile Network (PLMN).

2. Description of Related Art

With the advent and development of mobile telecommunications systems, telecommunications users are no longer physically bound to wireline terminals or fixed locations for telecommunications network communications. Using the added capabilities of roaming and interoffice handoffs, mobile subscribers may travel between multiple Public Land Mobile Networks (PLMNs) utilizing the same telephone number and the same mobile station to originate outgoing calls and to receive incoming calls. Thus, a mobile subscriber may access telecommunications service from multiple locations utilizing multiple service providers with any incurred fees being charged to a single subscription. Furthermore, calling parties do not necessarily have to know where the mobile subscriber is physically located in order to properly route and to establish a call connection. Data signals between visitor location registers (VLRS) and a home location register (HLR) automatically update and store subscriber information enabling the network to reroute incoming calls to the appropriate mobile switching center (MSC) serving the roaming mobile subscriber. Furthermore, regardless of which MSC is currently serving the mobile station, the VLR associated with the serving MSC communicates with the HLR assigned to the mobile station to retrieve the requisite subscriber data, including subscriber feature data and billing data, and provide uniform mobile service to the mobile station.

However, such uniformity in service is not always desirable for a subscriber who has a subscription obligation with a service provider. A mobile subscriber may have a call forwarding feature, such as Call Forwarding on Busy (CFB), activated towards a particular forward-to-number. If the forward-to-number is within the same local access transport area (LATA) as the mobile subscriber's home public land mobile network (PLMN), all incoming calls forwarded by the home PLMN to the specified forward-to-number are considered as local calls. However, if the mobile subscriber is traveling outside of his home PLMN area, the calls forwarded by the serving MSC to the specified forward-to-number are considered as inter-LATA calls and may incur unwanted long distance charges. For example, if the mobile subscriber is a New York resident having a subscription with a New York mobile service provider and has a New York wireline terminal as his or her CFB forward-to-number, any calls received by the serving New York MSC while the mobile subscriber is already busy are forwarded to the specified New York forward-to-number. Similarly, even if the mobile subscriber is traveling outside of New York and is being served by a visited New Jersey MSC, the incoming calls are still forwarded by the visited MSC to the previously designated New York forward-to-number. Unfortunately, such a long distance call connection between the New Jersey MSC and the New York forward-to-number may incur unwanted long distance charges for the mobile subscriber. However, the mobile subscriber is not conventionally able to avoid such an unfavorable billing practice by assigning a first forward-to-number while being served by a New York MSC and a second forward-to-number while being served by a New Jersey MSC.

As another example of not wanting to provide such uniformity in service to a roaming mobile station within a mobile network, the mobile subscriber might want to activate different subscriber features using different subscriber data when he or she is in one PLMN versus another PLMN. For example, if the subscriber is using mobile service within his or her home PLMN, the subscriber might want to charge the calls to his or her private subscription. However, if the subscriber is traveling within a particular service area outside of his or her home PLMN, the subscriber might want to charge the calls received or originated within that service area to his or her business subscription. As another illustration, the subscriber might only want to allow call waiting (CAW) when the subscriber is in one particular PLMN and disable the feature when in another PLMN.

Accordingly, there is a need for a mechanism to enable the mobile telecommunications network to selectively provide service area dependent subscriber data to a mobile switching center (MSC) serving a particular mobile station and to enable the serving MSC to provide service area dependent mobile service to the mobile station.

SUMMARY OF THE INVENTION

The present invention discloses a method and system for selectively providing different subscriber data to a mobile switching center (MSC) serving a particular mobile station depending on the current location of that mobile station. A home location register (HLR) associated with the mobile station receives a location update signal from an MSC currently serving the mobile station. The location update signal includes data identifying the service area currently serving the mobile station. By analyzing the received data, the HLR is able to determine the identity of the service area currently serving the mobile station. The HLR then retrieves subscriber data associated with the mobile station for that particular service area. The retrieved subscriber data are then communicated to the serving MSC. The serving MSC, in turn, utilizes the received subscriber data to provide service area dependent mobile service to the mobile station.

The service area determined and analyzed by the HLR includes a Public Land Mobile Network (PLMN) area currently covering the mobile station. The service area may also include an MSC coverage area currently covering the mobile station. Alternatively, the service area may also include a location area within a particular serving MSC coverage area. For the HLR to properly analyze and determine the location area, the location update signal transmitted by the serving MSC further includes data representing the location area currently serving the mobile station.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
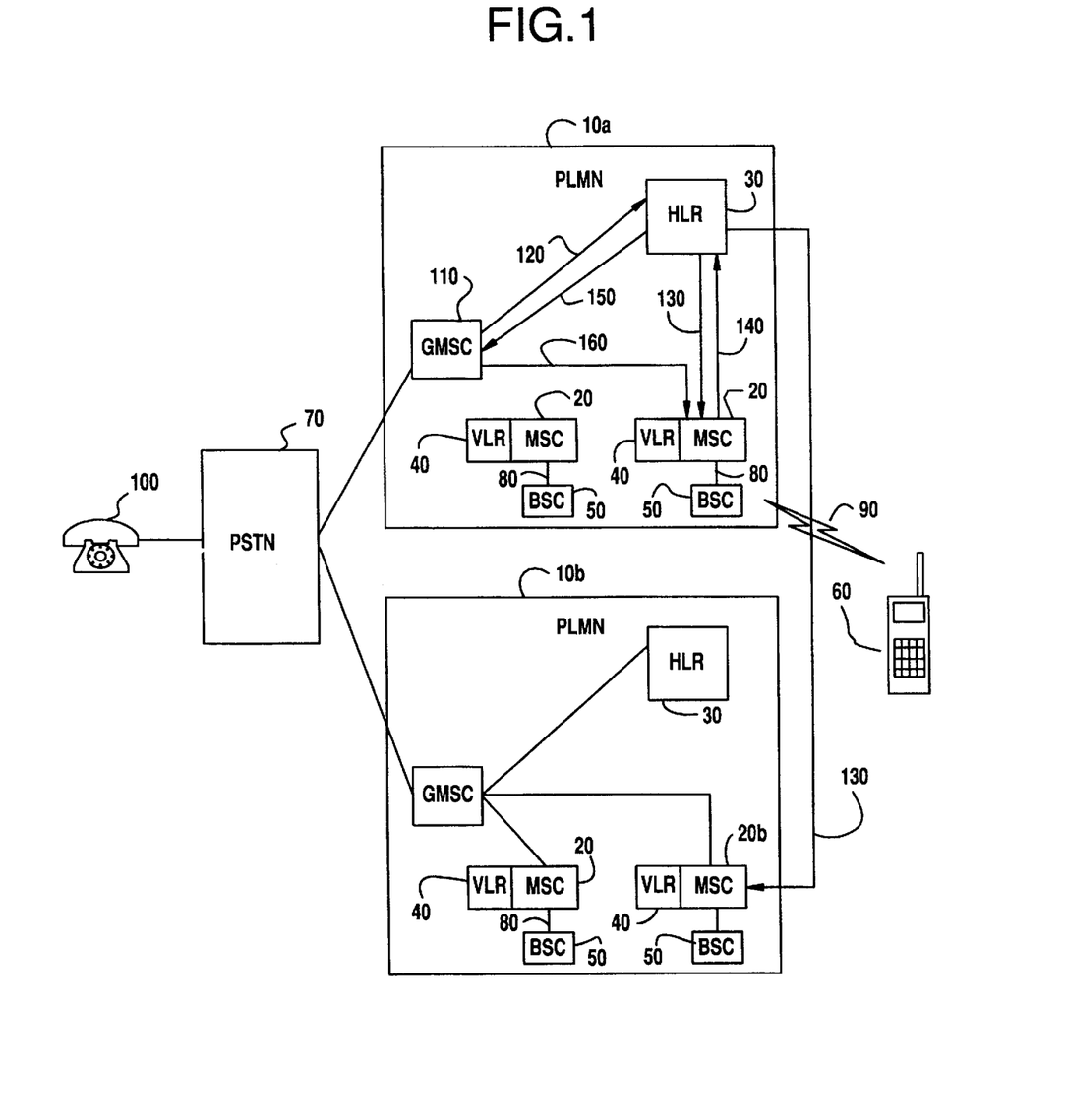
FIG. 1 is a block diagram illustrating a public land mobile network (PLMN) interfacing with a mobile station and a public switched telephone network (PSTN)

FIG. 1 shows a block diagram of a communications system in which the present invention, as will be disclosed herein, may be implemented. A PLMN 10a or 10b, which is used to communicate with a mobile station 60, comprises a mobile switching center (MSC) 20, a home location register (HLR) 30, a visitor location register (VLR) 40, and a base station controller (BSC) 50. The PLMN 10a or 10b is interfaced with a public switched telephone network (PSTN) 70 to provide a communications link to other telephone subscribers. The BSC 50 is connected to the MSC 20 using a digital communications link 80, and communicates with a mobile station 60 via radio channel 90. The HLR 30 is a database containing information about all "home" subscribers, their services and locations. By "home", it is meant that the subscribers have subscription agreements with the serving PLMN service provider. The VLR 40, on the other hand, is a database containing information about all "visiting" subscribers, their services and locations that are currently being served within this MSC 20 area. By "visiting", it is meant that the subscribers are currently being served by that particular MSC 20.

If the mobile station 60 ever travels out of its home PLMN 10a and travels into a visited PLMN 10b, a visited MSC 20b, for example, communicates with the HLR 30 within the home PLMN 10a to authenticate and verify telecommunications service for that subscriber and to retrieve needed subscriber information from the HLR 30. The visiting mobile station 60 is then registered as a "roaming" subscriber and accordingly provided with telecommunications service.

Whenever another telecommunications terminal, such as a wireline terminal 100, originates an outgoing call towards the mobile station 60 by dialing a directory number, such as a Mobile Subscriber Integrated Service Digital Network (MSISDN) number associated with the mobile station 60, a call setup signal is initially routed to the gateway mobile switching center (GMSC) 110 serving the home PLMN 10a for that mobile station 60. The GMSC 110 then queries the HLR 30 to determine the exact location of the mobile station 60 specified by the received MSISDN number. Accordingly, the GMSC 110 transmits a signal requesting a routing instruction to the HLR 30 (signal link 120). The HLR 30 determines the identity of the MSC 20 currently serving the mobile station 60 and further transmits a signal requesting a roaming number to the serving MSC 20 (signal link 130). The serving MSC 20 verifies that the mobile station 60 is currently within its service area and, as a result, returns the roaming number to the HLR 30 (signal link 140). The HLR 30, in turn, forwards the received roaming number back to the GMSC 110. The GMSC 110, utilizing the received roaming number, reroutes the received call setup signal, such as an Initial Address Message (IAM), to the specified MSC 20 (signal link 160). The serving MSC 20 then pages the mobile station 60 over a page channel (PCH), and upon receiving a response, establishes a speech connection with the mobile station 60 over a traffic channel (TCH).

Accordingly, for the mobile telecommunications network to properly provide mobile service towards a particular mobile station, certain information needs to be periodically updated. The HLR 30 associated with the mobile station 60 must be updated with the identity of the MSC 20 currently serving the mobile station 60. This information is later utilized by the GMSC 110 to reroute incoming calls to the appropriate serving MSC 20. The serving MSC 20 and its associated VLR 40 must also be updated with the requisite subscriber data to provide appropriate mobile service to the mobile station 60. Each time a call is originated from or terminated towards the mobile station 60, the serving MSC cannot afford to initiate a communication with the HLR 30 associated with the mobile station 60 to exchange the necessary information. Accordingly, the serving MSC 20 and the attached VLR 40 need to be updated with the necessary subscriber data specific to the visiting mobile station to properly service the mobile station. Such data include subscriber feature preferences, billing account information, etc.

Figure 2:
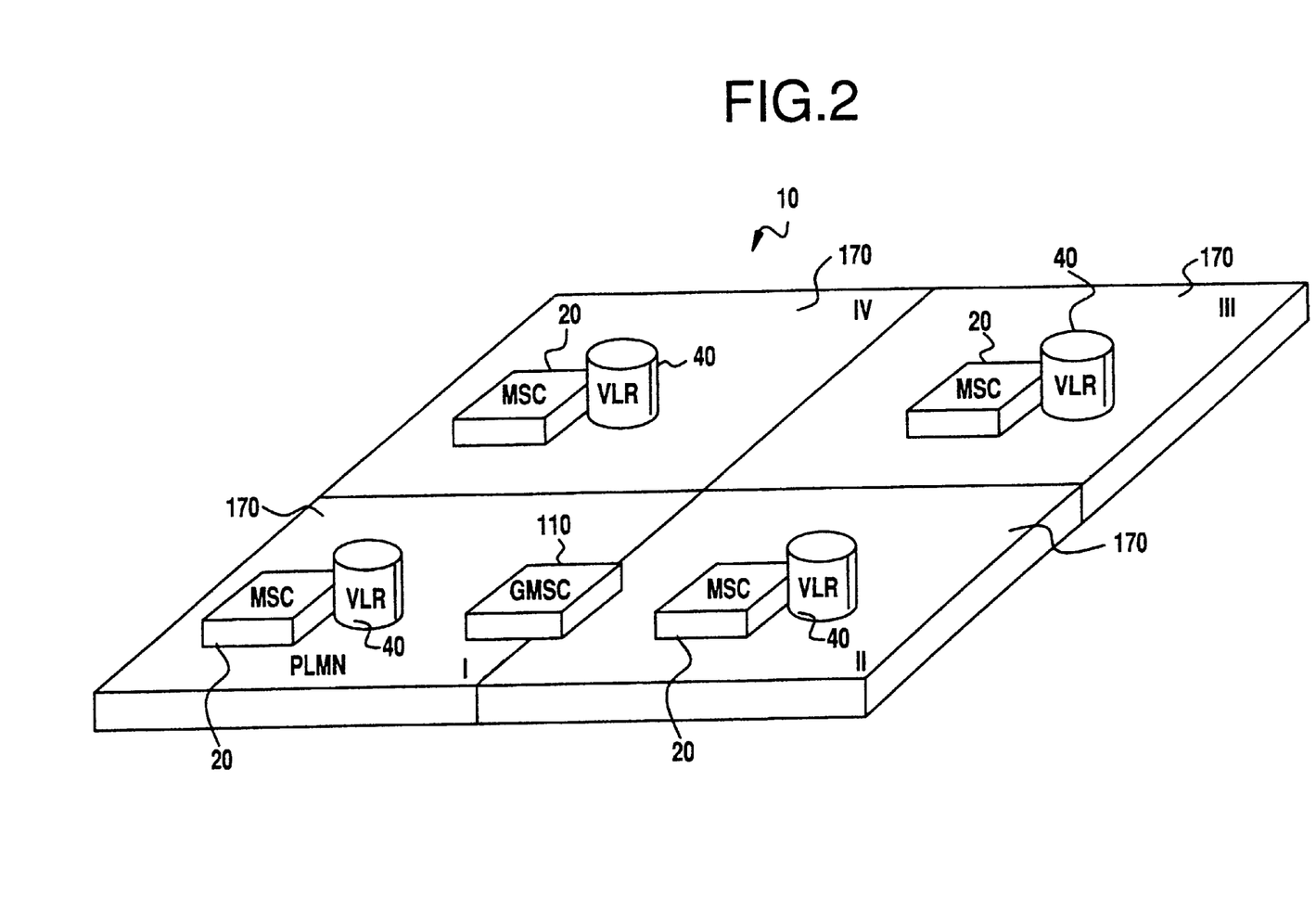
FIG. 2 is a diagram illustrating a single PLMN further comprising multiple mobile switching center (MSC) areas.

Reference is now made to FIG. 2 where a layout of multiple MSC areas 170 within a particular PLMN 10 is illustrated. A PLMN network 10 is a complex configuration comprising multiple MSCs 20, VLRs 40, HLRs (not shown in FIG. 2), Gateway MSC (GMSC) 110, etc. In order to properly route a call to a mobile station located within a particular PLMN, the right entities need to be invoked and involved in a call setup process. It is therefore important to identify and address each one of the entities in the PLMN network 10 accurately and distinctively. Accordingly, by evaluating the network address representing a particular MSC, one can accurately determine the identity of the PLMN and MSC area currently covering the mobile station.

Figure 3:
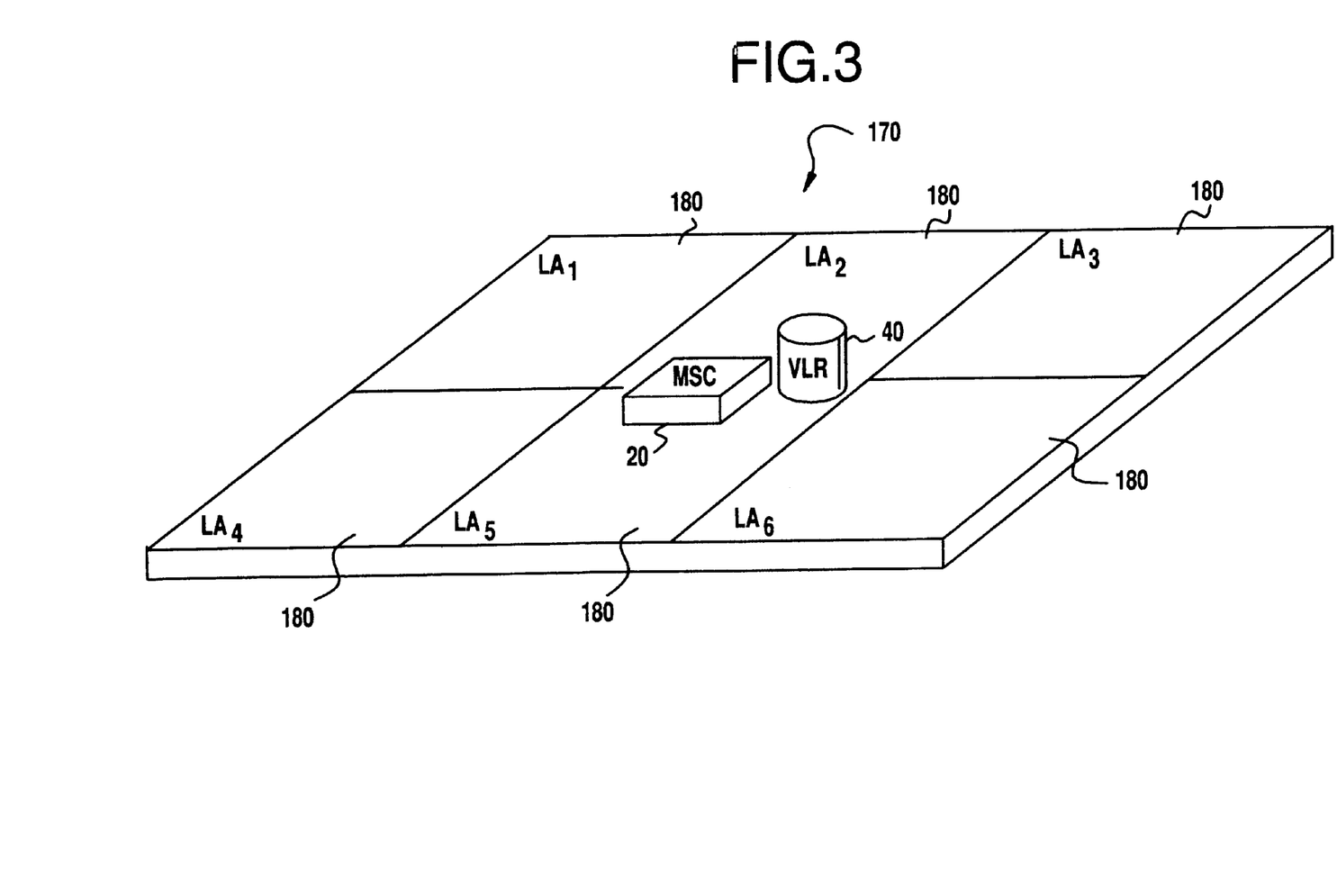
FIG. 3 is a diagram illustrating a single MSC area further comprising multiple location areas (LA)

FIG. 3 is a diagram illustrating a single MSC area 170 further comprising multiple location areas (LA) 180. All of the location areas within a single MSC area are served by the same MSC 20 and VLR 40. Furthermore, a location area is a service area in which a mobile station may move freely without updating location information to the MSC 20 and VLR 40 serving that location area. Therefore, a location area is the area where a paging message is broadcast to find the called mobile station for an incoming call. Accordingly, a location area identity (LAI) which uniquely identifies each location area is used by the mobile network to search for a mobile station in active state.

Figure 4:
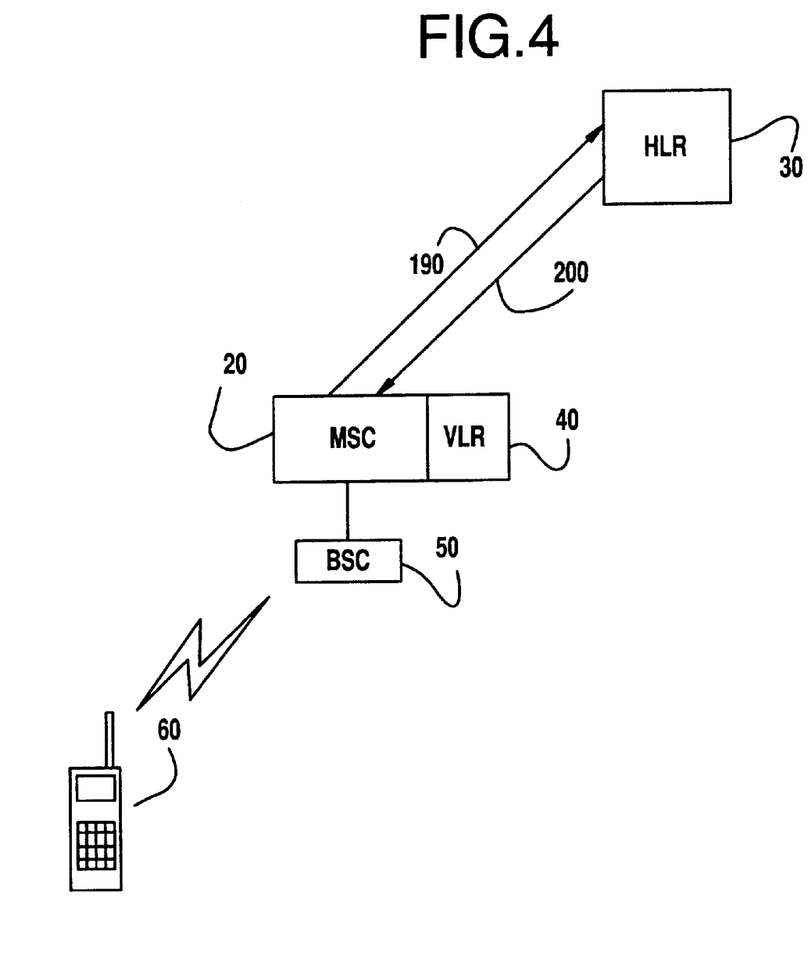
FIG. 4 is a block diagram illustrating a serving MSC performing a location update with a home location register (HLR)

In order for the mobile network to properly locate the called mobile station 60 and to reroute the incoming call to the appropriate MSC 20, the HLR 30 associated with the particular mobile station 60 needs to keep track of the current location of the mobile station 60. Accordingly, reference is now made to FIG. 4 illustrating a serving MSC 20 performing a location update with the HLR 30 associated with the mobile station 60. Whenever the mobile station 60 roams into one of the location areas being served by the MSC 20, the mobile station 60 attempts to register with the serving MSC 20 by transmitting an identification number, such as an International Mobile Subscriber Identity (IMSI) number, associated with the mobile station 60 to the serving MSC 20 via the BSC 50. In order to authenticate the mobile station 60, the serving MSC 20 utilizes the received IMSI number to transmit a location update signal (signal 190) to the HLR 30 associated with the roaming mobile station 60. By transmitting a Signaling Connection Control Point (SCCP) based Signaling System No. 7 (SS7) signal using the received IMSI number as the SCCP destination address enables the connecting telecommunications network to route the transmitted signal from the serving MSC 20 to the HLR 30. The HLR 30 associated with the roaming mobile station 60 then verifies the identity of the mobile station 60 and also updates its database to take note of the MSC currently serving the mobile station 60. Such information is later utilized by the HLR 30 to reroute incoming calls to the serving MSC 20. The HLR 30 further retrieves subscriber data associated with the mobile station 60 and communicates the retrieved data to the serving MSC performing the location update (signal 200). The transmitted data are then utilized by the serving MSC to provide mobile service to the roaming mobile station. Such subscriber data includes forward-to-numbers for call forwarding features, billing data, long distance carrier data, etc.

Upon receiving the transmitted subscriber data, the serving MSC 20 stores the data at the attached VLR 40. Thereinafter, mobile service in accordance with the received subscriber data is provided to the roaming mobile station 60. By requiring the serving MSC 20 to retrieve subscriber data from the HLR 30 specifically associated with the mobile station 60, regardless of which MSC is serving the mobile station 60, the same subscriber feature data, billing subscription, and other user defined information are utilized to provide uniform mobile service to the mobile station 60.

Figure 5:
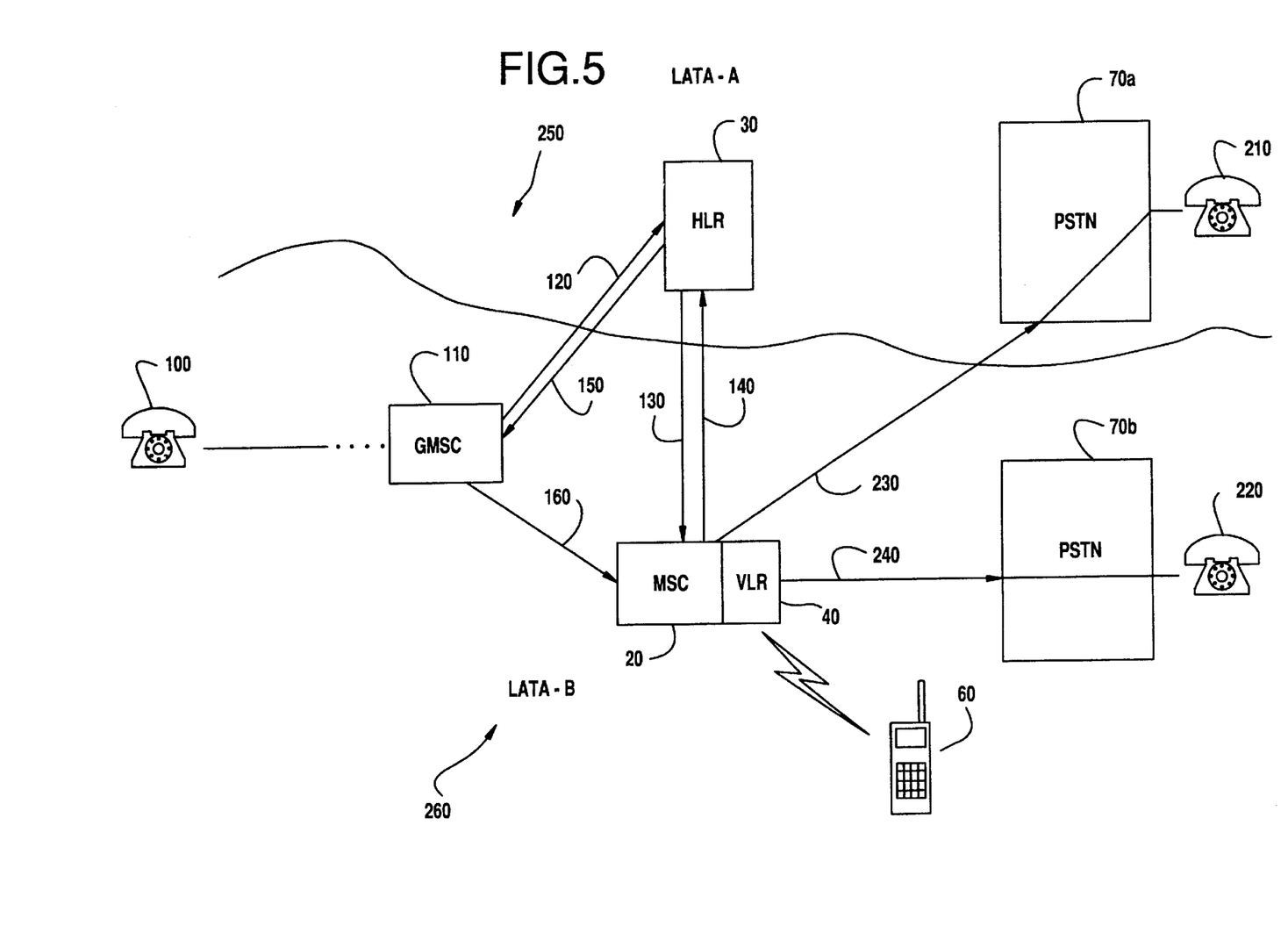
FIG. 5 is a block diagram illustrating the forwarding of an incoming call by a serving MSC to a designated forward-to-number.

However, such uniformity in service is not always desirable for a subscriber who has a subscription obligation with a service provider. Reference is made to FIG. 5 illustrating the forwarding of an incoming call by a serving MSC 20 to a designated forward-to-number. Upon performing a location update with the HLR 30, the serving VLR 40 is updated with the requisite subscriber data including the forward-to-number for the Call Forward on Busy (CFB) subscriber feature. Thereinafter, another telecommunications terminal, such as the wireline terminal 100, dials the MSISDN number associated with the mobile station 60 and originates a call connection. A generated call setup message, such as an IAM signal, is first received by the serving GMSC 110 associated with the home PLMN for the mobile station 60. The GMSC 110 then transmits a signal requesting routing instruction to the HLR 30 associated with the received MSISDN number (signal 120). The HLR 30, by retrieving the network address of the serving MSC 20 received during the last location update, also sends a signal requesting a roaming number to the serving MSC 20 (signal 130). The serving MSC 20 returns a roaming number to the HLR 30 (signal 140) and the HLR 30, in turn, forwards the received roaming number back to the GMSC 110 (signal 150). Utilizing the received roaming number, the incoming call is properly rerouted to the serving MSC 20. The serving MSC 20 then determines that the mobile station 60 is already in speech connection with another terminal and ascertains whether the mobile station 60 has one of the call forwarding features activated. Upon determining that the mobile station 60 has CFB activated, the serving MSC 20 retrieves the previously stored forward-to-number from the VLR 40 and accordingly forwards the received incoming call to the specified forward to number. As an illustration, a call connection between the wireline terminal 100 and a first telecommunications terminal 210 is accordingly established. Such a call connection is inefficient and wasteful if the first telecommunications terminal 210 is located within the same LATA (LATA-A) 250 as the home PLMN and the mobile station is currently being served by the MSC 20 within a visited LATA (LATA-B) 260. Because of the fact that a trunk call connection has been established from the GMSC 110 to the serving MSC 20 and then back to the first telecommunications terminal 210, a wasteful call connection from LATA-A to LATA-B and then back to LATA-A has been established. As a result, the mobile subscriber has to pay for the long distance charges incurred for rerouting the call connection back to the first telecommunications terminal 210 located within LATA-A 250.

It would be advantageous for the mobile subscriber to instead route the incoming call to a second telecommunications terminal 220 located within the same as or the closest LATA (LATA-B) to the visited PLMN. By forwarding an incoming call to the second telecommunications terminal 220, no long distance charges are incurred by the mobile station 60. Consequently, as long as the mobile station 60 is traveling within the coverage area supported by the visited MSC 20, it would be advantageous for the mobile network to forward incoming calls for CFB to the second telecommunications terminal 220. Thereinafter, whenever the mobile station 60 roams back into the home PLMN, the first telecommunications terminal 210 is again utilized as the new forward-to-number.

Accordingly, there is a need for a mechanism to enable the mobile telecommunications network to selectively provide service area dependent subscriber data to a mobile switching center (MSC) serving a particular mobile station and to enable the serving MSC to provide service area dependent mobile service to the mobile station.

Figure 6:
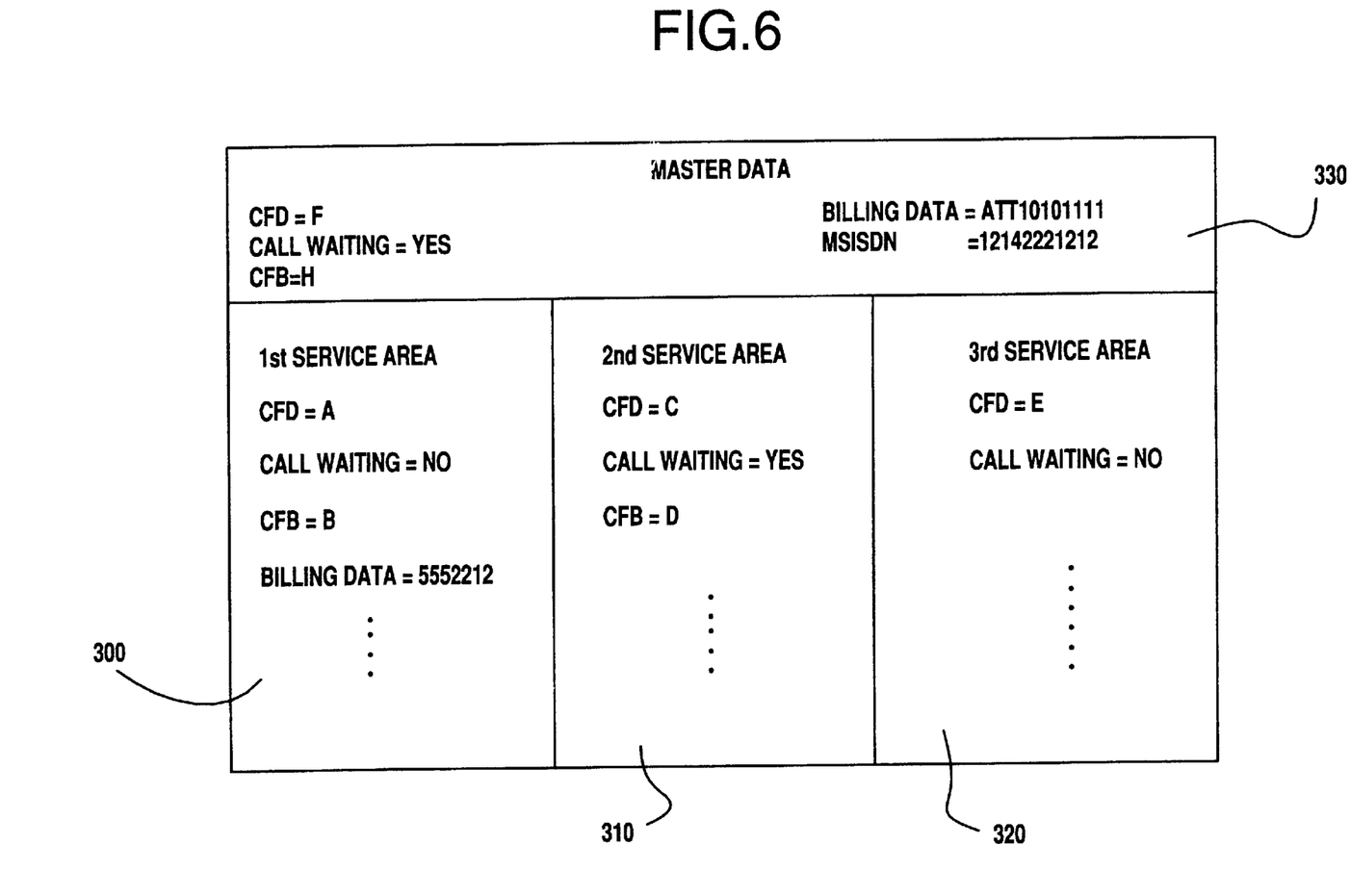
FIG. 6 is a logical layout of providing different subscriber features and mobile service towards different service areas.

FIG. 6 is a logical illustration of providing different subscriber features and mobile service towards different service areas. As can be seen from the logical display, whenever the mobile station is located within the first service area, first service area dependent subscriber feature and service 300 are provided to the mobile station. Such feature or service includes call forwarding to a local number within the same service area. It may also include deactivating the unnecessary call waiting feature. It may further specify a subscription account responsible for all service charges incurred by the mobile station within the first service area. Similarly, if the mobile station is located within the second service area, second service area dependent subscriber feature and service 310 are provided to the mobile station. Again, in order to reduce long distance charges, a local directory number within the same LATA can be provided as the forward-to-number for the CFB subscriber feature. Similarly, another set of service area dependent subscriber data 320 can be provided for a third service area.

In order to reduce the redundancy and to provide the necessary subscriber data to a service area not specified by the mobile subscriber, master data 330 are further stored at the HLR. Only the data which are service area dependent are stored separately correlated with the corresponding service area. In case a portion of the required subscriber data are not stored correlated to the service area currently serving the mobile station, the missing data are retrieved from the master data register 330. For example, no Call Forwarding on Busy (CFB) forward-to-number is provided for the third service area 320. Accordingly, the master CFB forward-tonumber from the master data register 330 is accordingly utilized for the mobile station within the third service area. Furthermore, certain data remain constant regardless of which service area is serving the mobile station. As an illustration, the MSISDN number associated with the mobile station should stay the same regardless of which MSC is currently providing mobile service to the roaming mobile station. Accordingly, those data are further stored in the master data register 330. Lastly, in case the mobile station roams into a service area not previously specified by the mobile station, the subscriber data from the master data register 330 are accordingly provided to the service area.

Figure 7:
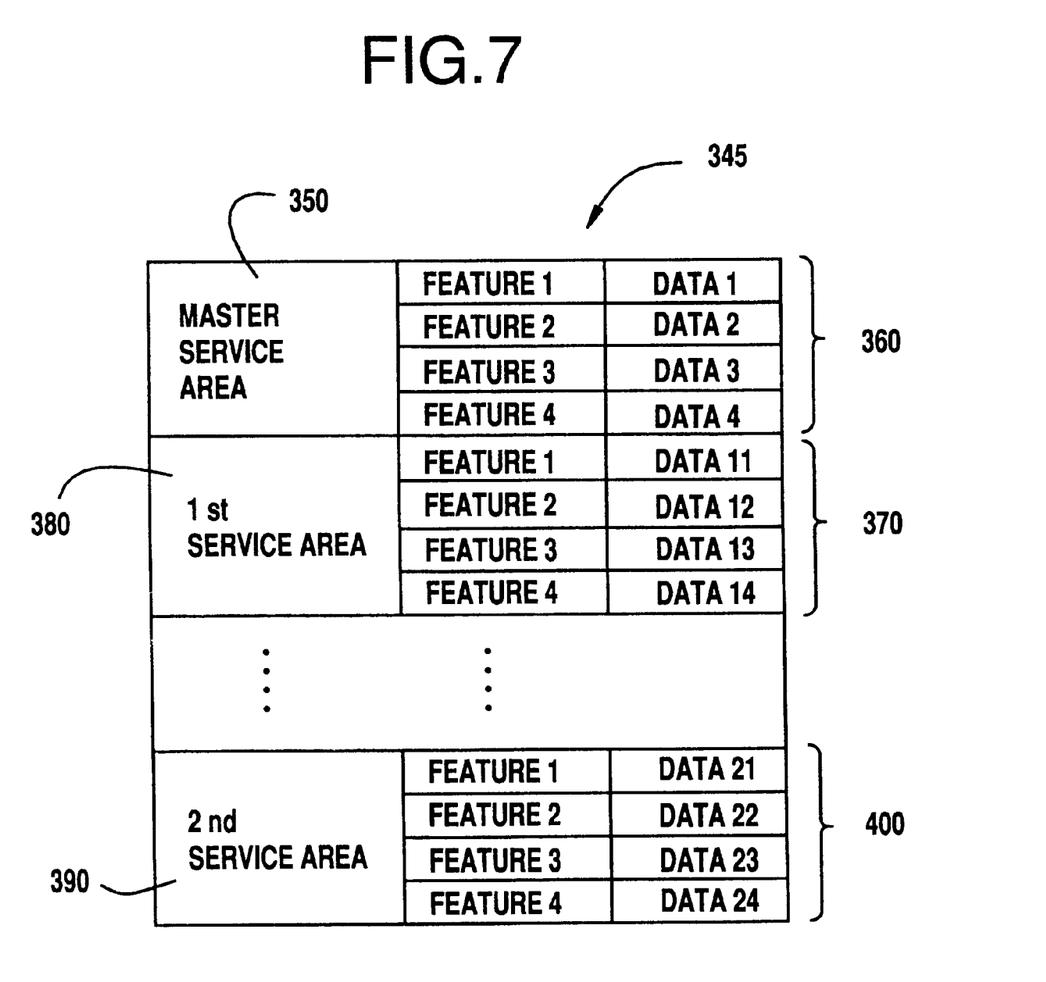
FIG. 7 is an exemplary data structure for storing service area dependent subscriber data for a particular mobile subscriber.

FIG. 7 is an exemplary data structure 345 for storing service area dependent subscriber data for a particular mobile subscriber at a home location register (HLR) associated with that particular mobile subscriber. A relational database structure with a number of tuplets are associated with each service area. If the mobile station is traveling with a first service area 380, the subscriber data 370 correlated with the first service area 380 are provided by the HLR to the serving MSC. Any data needed by the serving MSC, yet not specified within the subscriber data 370, are instead retrieved from the subscriber data 360 correlated with the master service area 350. Similarly, in case the mobile station travels into a second service area 390, the subscriber data 400 correlated with the second service area 390 are retrieved from the HLR and provided to the serving MSC. Lastly, in case the mobile station travels into a service area not identified by any of the service areas pre-designated by the subscriber, the master service subscriber data 360 are again provided to the serving MSC.

As a result, the mobile subscriber is able to pre-store wanted subscriber data for a selected number of service areas and still enable the mobile network to provide uniform mobile service within the rest of the mobile network.

Figure 8:
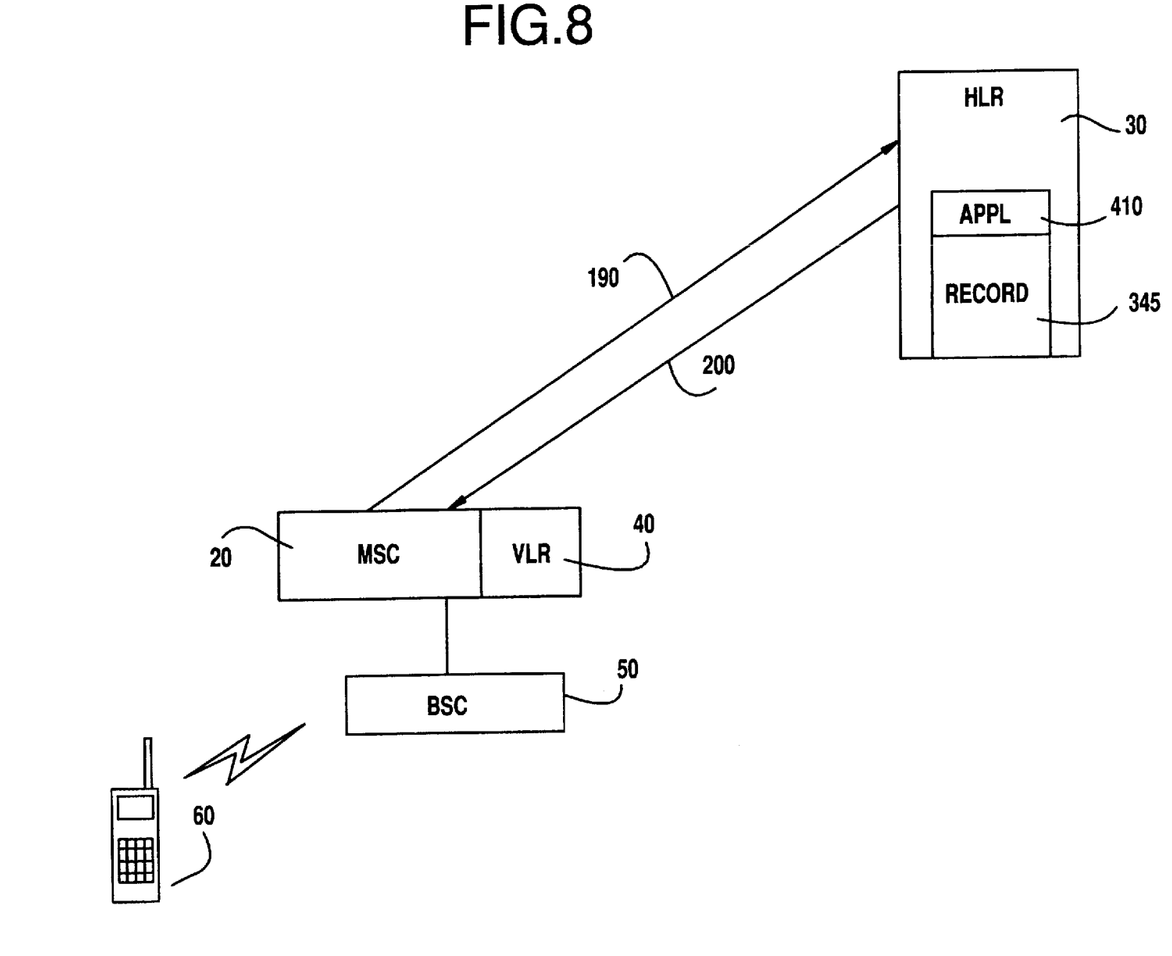
FIG. 8 is a block diagram illustrating the HLR associated with a particular mobile station providing service area dependent subscriber data to a visited MSC.

FIG. 8 is a block diagram illustrating the HLR 30 associated with the mobile station 60 providing service area dependent subscriber data to the serving MSC 20. Whenever the mobile station 60 is turned on or travels into a new location area, the mobile station 60 performs a location update procedure with the serving MSC 20. The serving MSC 20, in turn, transmits a location update signal to the HLR 20 associated with the registering mobile station 60 (signal 190). While transmitting the location update signal, the serving MSC further includes data representing the service area currently serving the mobile station 60. In case the mobile network wishes to provide PLMN or MSC service area dependent subscriber data, a network address representing the serving MSC is transmitted to the HLR 30. By analyzing the network address, for example, representing the serving MSC, the HLR 30 is able to determine the identity of the PLMN or MSC coverage area serving the mobile station. In case the mobile network wishes to provide location area dependent subscriber data, the location update signal further needs to include data representing the serving location area, such as a location area identity (LAI). Upon receiving the location update signal from the serving MSC 20, an application module 410 associated with the HLR 30 analyzes the data representing the service area currently serving the mobile station and accordingly retrieves the subscriber data correlated with the analyzed service area from the data register 345. As described above, in case portions of the requisite subscriber data are not provided by the service area dependent subscriber data, or in case the analyzed service area is not included as one of the pre-stored service areas within the data register 345, the master service area data are instead retrieved. Using a signal, such as a Mobile Application Part (MAP) based Insert_Subscriber_Data signal, the HLR 30 communicates the retrieved data to the serving MSC 20 (signal 200). The serving MSC then stores the received data to the attached VLR 40. Thereinafter, the stored subscriber data area utilized by the serving MSC 20 to provide mobile service to the mobile station 60. As an illustration, a forward-to-number for CFB representing a local terminal within the serving service area is retrieved by the HLR 30 and communicated back to the MSC 20 and VLR 40. Subsequently, all incoming calls received by the serving MSC 20 while the mobile station 60 is busy are forwarded by the serving MSC 20 to the specified local forward-to-number without incurring unwanted long distance charges. In case the mobile station 60 roams into a different service area, another set of subscriber data, including another local CFB forward-to-number, are again retrieved for this new service area and accordingly provided to the new MSC.

Figure 9:
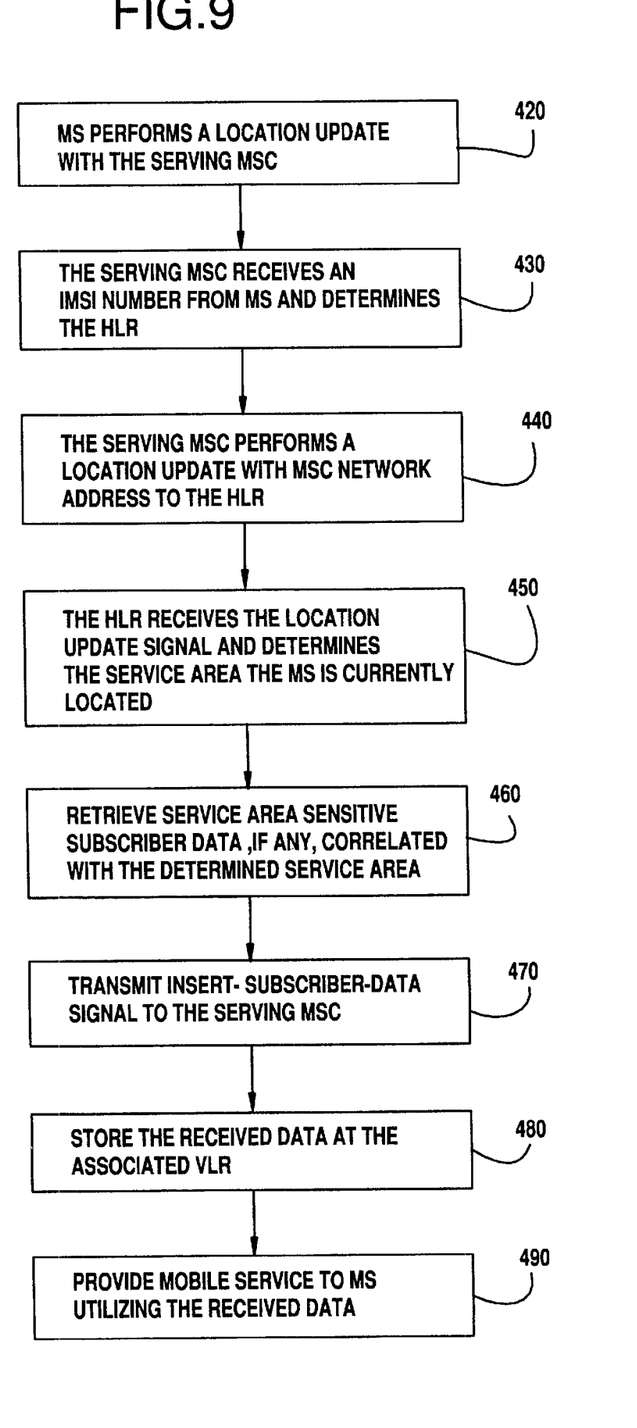
FIG. 9 is a flowchart illustrating the exemplary steps performed within a mobile telecommunications network for providing service area dependent subscriber data to a visited MSC.

FIG. 9 is a flowchart illustrating the exemplary steps performed within a mobile telecommunications network for providing service area dependent subscriber data to a visited MSC. As described above, whenever a mobile station travels into a new location area, the mobile station performs a location update with the serving MSC at step 420 and transmits its International Mobile Subscriber Identity (IMSI) number. By analyzing the received IMSI number, the serving MSC determines the identity of the HLR associated with the registering mobile station at step 430. The serving MSC, in turn, performs a location updated with the HLR associated with the mobile station to inform the HLR of the mobile station's new location and to retrieve the requisite subscriber data at step 440. The serving MSC further transmits data representing the service area currently serving the mobile station. If the service area includes the serving PLMN or MSC coverage area, the network address presenting the serving MSC suffices. If the service area includes the location area currently serving the mobile station, the address, such as a location area identity (LAI) or cell identity, needs to be transmitted to the HLR.

As a result, the HLR receives the location update signal from the serving MSC and determines the service area currently serving the roaming mobile station at step 450. Utilizing the determined service area, the HLR retrieves the subscriber data correlated with the current service area for the roaming mobile station at step 460. Using a MAP based Insert_Subscriber_Data signal, the HLR transmits the retrieved subscriber data to the serving MSC at step 470. Upon receiving the service area dependent subscriber data from the HLR, the serving MSC stores the data at the attached VLR at step 480. Thereinafter, utilizing the subscriber data provided by the HLR, the serving MSC provides mobile service to the roaming mobile station at step 490.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for providing service area dependent mobile service to a mobile subscriber within a mobile telecommunications network, comprising the steps of:

defining, by a mobile subscriber, a plurality of different subscriber data for a select mobile service for each one of a plurality of special service areas, each of said special service areas being comprised of an area covered by a service node serving said mobile subscriber within said mobile telecommunications network, said select mobile service being provided by a single service provider;

determining a current service area of said mobile subscriber;

checking if said current service area matches one of said plurality of special service areas; and if said current service area matches one of said plurality of special service areas, providing said select mobile service to said mobile subscriber in accordance with said defined subscriber data associated with said select mobile service for said current service area.

2. The method of claim 1 wherein said step of determining further comprises the step of receiving a signal from a mobile switching center (MSC) serving said mobile subscriber, said signal including data identifying said current service area.

* * * * *

UNITED STATES PATENT AND TRADEMARK OFFICE
CERTIFICATE OF CORRECTION

PATENT NO. : 6,038,445  
DATED : March 14, 2000  
INVENTOR(S) : Alperovich et al.

Page 1 of 1

It is certified that error appears in the above-identified patent and that said Letters Patent is hereby corrected as shown below:

On the title page, Item [56] Reference Cited  
U.S. Patent Documents

Replace "5, 812, 950  9/1998" with —5,812,950 11/ 1995—

Column 1, line 29

Replace "(VLRS)"  
With —(VLRs) —

Signed and Sealed this

Fifth Day of June, 2001

*Attest:*

*Attesting Officer*

NICHOLAS P. GODICI

*Acting Director of the United States Patent and Trademark Office*